United States Patent
Marinovic et al.

(10) Patent No.: US 11,349,941 B2
(45) Date of Patent: May 31, 2022

(54) SYSTEMS AND METHODS FOR VALIDATING HUMAN MOBILE USERS WITH WIRELESS SIGNALS

(71) Applicant: PricewaterhouseCoopers LLP, New York, NY (US)

(72) Inventors: Srdjan Marinovic, Washington, DC (US); Anne E. Morrow, Washington, DC (US); Kristopher E. Herring, Washington, DC (US)

(73) Assignee: PricewaterhouseCoopers LLP, New York, NY (US)

( * ) Notice: Subject to any disclaimer, the term of this patent is extended or adjusted under 35 U.S.C. 154(b) by 0 days.

(21) Appl. No.: 17/051,657

(22) PCT Filed: Jun. 24, 2019

(86) PCT No.: PCT/US2019/038629
§ 371 (c)(1),
(2) Date: Oct. 29, 2020

(87) PCT Pub. No.: WO2020/005786
PCT Pub. Date: Jan. 2, 2020

(65) Prior Publication Data
US 2021/0075872 A1    Mar. 11, 2021

Related U.S. Application Data

(60) Provisional application No. 62/692,113, filed on Jun. 29, 2018.

(51) Int. Cl.
*H04L 29/08*    (2006.01)
*H04W 4/029*    (2018.01)
(Continued)

(52) U.S. Cl.
CPC .............. *H04L 67/18* (2013.01); *H04L 67/22* (2013.01); *H04L 67/34* (2013.01); *H04W 4/029* (2018.02)

(58) Field of Classification Search
CPC ......... H04L 67/18; H04L 67/22; H04L 67/34; H04W 4/029
See application file for complete search history.

(56) References Cited

U.S. PATENT DOCUMENTS 9,743,436 B1    8/2017  Bradish
9,756,608 B1    9/2017  Bradish
(Continued)

FOREIGN PATENT DOCUMENTS

WO    WO-2016001506 A1 *  1/2016  ........... H04B 13/005

OTHER PUBLICATIONS

International Search Report and Written Opinion issued in International Application No. PCT/US2019/038629 dated Sep. 20, 2019.
(Continued)

*Primary Examiner* — Christopher B Robinson
(74) *Attorney, Agent, or Firm* — Morrison & Foerster LLP (57) ABSTRACT

Disclosed herein are embodiments of systems, methods, and products comprising an analytic server, which builds a pipeline of five classifiers to validate whether an electronic device is operated by a human user. The server monitors wireless signals detected by different electronic devices by triggering a signal scanning function on the electronic devices. Based on the wireless signals reported by different electronic devices, the server generates a set of signal clusters. The server applies the pipeline of five classifiers on the wireless signals detected by an electronic device by exploiting the signal clusters included in the wireless signals. If any of the classifiers determines the electronic device
(Continued)

is a legitimate human device, the server validates the electronic device; otherwise, the server applies the next classifier. If after a number of classifiers, none of the classifiers validates the device usage, the server determines that the device is not operated by a human.

20 Claims, 8 Drawing Sheets

(51) Int. Cl.
*H04L 29/06* (2006.01)
*H04L 67/52* (2022.01)
*H04L 67/50* (2022.01)
*H04L 67/00* (2022.01)

(56) References Cited

U.S. PATENT DOCUMENTS

| | | | |
|---|---|---|---|
| 9,853,826 B2 | 12/2017 | Shuman et al. | |
| 9,900,171 B2 | 2/2018 | Guedalia et al. | |
| 9,998,868 B2 | 6/2018 | Mochizuki et al. | |
| 10,511,938 B1 * | 12/2019 | Marinovic | H04W 4/029 |
| 2006/0046709 A1 | 3/2006 | Krumm et al. | |
| 2006/0074494 A1 | 4/2006 | McFarland | |
| 2008/0139114 A1 | 6/2008 | Ranganathan | |
| 2010/0234045 A1 | 9/2010 | Karr et al. | |
| 2011/0306354 A1 * | 12/2011 | Ledlie | H04W 64/00 455/456.1 |
| 2014/0241354 A1 | 8/2014 | Shuman et al. | |
| 2015/0065166 A1 | 3/2015 | Ward et al. | |
| 2015/0133162 A1 | 5/2015 | Meredith et al. | |
| 2015/0334678 A1 | 11/2015 | Macgougan et al. | |
| 2016/0078738 A1 | 3/2016 | Basalamah et al. | |
| 2016/0128017 A1 | 5/2016 | Qiu et al. | |
| 2018/0014217 A1 * | 1/2018 | Kleinbeck | H04W 24/10 |
| 2018/0020329 A1 | 1/2018 | Smith | |
| 2018/0091513 A1 * | 3/2018 | Du | H04L 51/04 |
| 2020/0344227 A1 * | 10/2020 | Das | G06V 40/70 |

OTHER PUBLICATIONS

International Search Report and Written Opinion issued in International Application No. PCT/US2019/042750 dated Oct. 3, 2019.
International Search Report and Written Opinion issued in International Application No. PCT/US2019/049630 dated Nov. 18, 2019.
Kim et al., "Discovering semantically meaningful places from pervasive RF-beacons," in Proceedings of the 11th international conference on Ubiquitous computing. Oct. 3, 2009, Retrieved on Oct. 26, 2019 from <http://www.eecs.ucf.edu/~lboloni/Teaching/EEL6788_2010/papers/Kim-PlacesRFBeacons.pdf>.

* cited by examiner

SYSTEMS AND METHODS FOR VALIDATING HUMAN MOBILE USERS WITH WIRELESS SIGNALS

CROSS REFERENCE TO RELATED APPLICATIONS

This application is the U.S. National Stage of International Application No. PCT/US2019/038629, filed Jun. 24, 2019, published as WO2020/005786 on Jan. 2, 2020, which claims priority under 35 U.S.C. 119(e) to U.S. Provisional Application No. 62/692,113, filed Jun. 29, 2018, all of which are hereby incorporated by reference in their entirety.

TECHNICAL FIELD

This application relates generally to methods and systems for validating legitimacy of electronic device usage, and more specifically detecting whether a mobile application has been installed on human-operated mobile devices.

BACKGROUND

Fraudulent mobile application ("app") installs have been a growing problem for mobile platforms and app developers. The attackers want to convince an app publisher that multiple instances of the app have been installed on mobile devices used by human users to fraudulently increase the number of app installations. Instead, an attack process may involve installing app instances onto phones in install "farms," where after some time, the app instances are deleted, and the phones' advertising identifiers (adids) are changed. The process is then repeated. The attacker may also perform the same process using workstations and phone emulators. Furthermore, in a browser setting, other forms of fraud emulating human users have been a chronic problem. For example, attackers running scripts to emulate human users clicking on browser-based advertisement objects (e.g., banners) has been an age-old problem.

In addition to allowing an installed app to run for a time period (to allow for any post-install checks initiated by the cloud), an attacker may spoof the location of each phone by using readily available geo-spoofing apps. Typically, the attacker may simulate movements in particular geographic areas (e.g., urban areas, shopping districts) to generate a fraudulent indication that instances of the mobile app have been installed by high-value users. The attacker may also spoof wireless signals received by mobile devices by installing external hardware equipment on site. In addition, the attacker may have access to the partial WiFi information for some urban areas, for example, Mozilla Location Service, and use this partial information to generate similar WiFi signals at an install farm. The attacker may also change the WiFi configurations to show a more sophisticated signal context.

Existing solutions to the problem of fraudulent mobile app installs either observe the rate of new installs and simply discard all installs if the rate is high or use an Internet protocol (IP) black list. Both of these solutions are flawed in that the former cannot distinguish between human and non-human users, and the black lists are easily circumvented in the latter. Another solution is to analyze phone's reported latitudes and longitudes (GPS data) and inspect whether they change over time. However, this solution can be readily circumvented by location spoofing apps installed on the attacker's phones. Another solution is a post-installation call-back, wherein the app in a predetermined time interval after installation sends a call-back message to a server of the app provider. However, attackers may intercept a copy of the call-back message and may fraudulently send multiple copies of such messages falsely indicating that multiple instances of the app were installed on multiple mobile devices for the predetermined time interval. Furthermore, existing fraud-detection tools may generate false positives when a user is using a virtual private network (VPN). For example, existing fraud-detection tools may categorize an app install as invalid if the user's location seems to be spoofed, which may occur if the user is using a VPN.

SUMMARY

What is therefore desired are systems and methods that validate that a mobile device is operated or carried by a human user, including classifiers that distinguish between human-operated mobile devices and attacks mimicking human-operated mobile devices.

Embodiments disclosed herein solve the aforementioned problems and other problems by executing a set of classifiers in a fraud-detection system that validates whether a mobile device is operated by a human user, in contrast to a bot, an emulator, a phone at an install farm, or any similar mechanism. Generally, the fraud-detection system observes and analyzes the signal context of the mobile device. More specifically, the fraud-detection system may rely on collecting wireless signal data for the set of classifiers. The wireless signals may comprise WiFi, Bluetooth, and Bluetooth Light (BLE) signals. Because WiFi signals require setting up and maintaining external routers, the WiFi signals can be more expensive and harder for attackers to spoof than GPS location signals. In addition, spoofing Bluetooth and BLE signals is harder still as these signals require additional hardware setups. The set of classifiers may take as input a stream of events (observations), where each event is a set of signals that a phone's sensor can detect and identify wireless signal anomalies based on the stream of events.

In one embodiment, a computer implemented method comprises receiving, by a computer, an indication that a mobile software application has been installed on a mobile device; triggering, by the computer, a signal scanning function on the mobile device to cause the mobile device to detect wireless signals and transmit identification information of the detected wireless signals to the computer; receiving, by the computer, identification information of a plurality of wireless signals detected by the mobile device at different time points for a predetermined time window; generating, by the computer, a set of one or more signal clusters associated with the mobile device based on the spatial proximity and temporal persistence of the plurality of wireless signals; and executing, by the computer, a first classifier to determine whether the mobile device is operated by a human user based upon a change of geolocations of the mobile device and a change between the one or more signal clusters observed with the mobile device.

In another embodiment, a system comprises a non-transitory storage medium storing a plurality of computer program instructions; and a processor electrically coupled to the non-transitory storage medium and configured to execute the plurality of computer program instructions to: receive an indication that a mobile software application has been installed on a mobile device; trigger a signal scanning function on the mobile device to cause the mobile device to detect wireless signals and transmit identification information of the detected wireless signals to the processor; receive identification information of a plurality of wireless signals detected by the mobile device at different time points for a predetermined time window; generate a set of one or more signal clusters associated with the mobile device based on the spatial proximity and temporal persistence of the plurality of wireless signals; and execute a first classifier to determine whether the mobile device is operated by a human user based upon a change of geolocations of the mobile device and a change between the one or more signal clusters observed with the mobile device.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe employing a registry environment context to distinguish between human-operated mobile phones and any other hardware and/or software tools mimicking human-operated mobile phones. More specifically, as opposed to analyzing human behavior while using a mobile phone, an illustrative computer analyzes one or more wireless signal environments (or context) that a human-operated mobile phone may interface and interact with. For example, a person may be associated with a few stable hyperclusters on a daily basis. A hypercluster (or a signal cluster), as used herein, may refer to a set of wireless signals associated with one another through multiple observations, and which may be further associated with a given location. For example, one or more hyperclusters associated with a given office may include wireless signals generated a plurality of WiFi routers, Bluetooth transmitters, and/or Bluetooth Low Energy (BLE) transmitters in the office. In other words, these hyperclusters may form a wireless signature for the office, and the computer may deduce that a mobile device receiving signals associated with the hypercluster is in the office. As described above, the person may be associated with a home hypercluster, an office hypercluster, and a favorite restaurant hypercluster. Based on the movement of a mobile phone vis-à-vis these hyperclusters, the computer may deduce that the mobile phone is operated by the user. For example, the computer may determine that the mobile phone interfaces: (i) the home hypercluster overnight and during the morning hours, (ii) the office hypercluster during normal business hours, (iii) the favorite restaurant hypercluster after business hours, and/or (iv) home hypercluster during the evening. The computer may determine, based on these observations, that the movement of the mobile phone corresponds to a human pattern and that the mobile is being operated by a human.

The analytic server may receive the reports of (or information of) wireless signals detected by the electronic devices for a sliding time window. Based on the reports from different electronic devices, the analytic server may generate a set of hyperclusters or signal clusters. The signal clusters may be a set of wireless signals that are persistently detected by different devices and are stable over time. The signal clusters may represent the environmental context of the electronic devices. The analytic server may apply a pipeline of classifiers (e.g., five classifiers) on the wireless signals detected by an electronic device, where each classifier determines the legitimacy of device usage by exploiting the environmental context included in the wireless signals. The analytic server may represent a human as a pattern of life through environment. In the pipeline of classifiers, if a first classifier determines the electronic device is a legitimate human device (for example, a mobile device and not a bot or an emulator), the analytic server may validate the electronic device; otherwise, the analytic server may apply a second classifier. This process may proceed on to other classifiers, until one of the classifiers determines the usage of the electronic device is legitimate. If none of the classifiers validate the device usage, the analytic server determines the device is not operated by a human or is unknown. Furthermore, using the signal context, the analytic server may eliminate false positives where human users using VPN may be misclassified based on an inconsistent location information.

In one or more illustrative embodiments, the analytic server uses five classifiers. However, it is intended that any number of classifiers may be used. Also, it is intended that the classifiers described herein are merely illustrative, and different classifiers may be used by the analytic server. Furthermore, the aforementioned order of executing classifiers is merely illustrative, and the analytic server may execute these or other classifiers in a different order.

While a fraudulent device, a bot or an emulator may simulate normal user behavior and try to appear as a valid user, the analytic server may validate the usage of an electronic device based on environmental context as opposed to user behavioral context. Because the environmental context is hard for attackers to spoof, the analytic server may be able to identify the electronic devices not operated by human more effectively. Wireless signal clusters detected by the electronic device may represent the environmental context of the electronic device. As discussed above, a hypercluster or signal cluster may be a set of wireless signals that are constantly detected by different devices and are stable over time. Generally, an electronic device operated by a human may be associated with two or three such signal clusters that are used orders of magnitude more than other clusters. For example, the signal clusters may respond to the set of wireless signals detected by an electronic device when the user is at work, home, or a favorite restaurant or bar the user stops in every night.

Figure 1A:
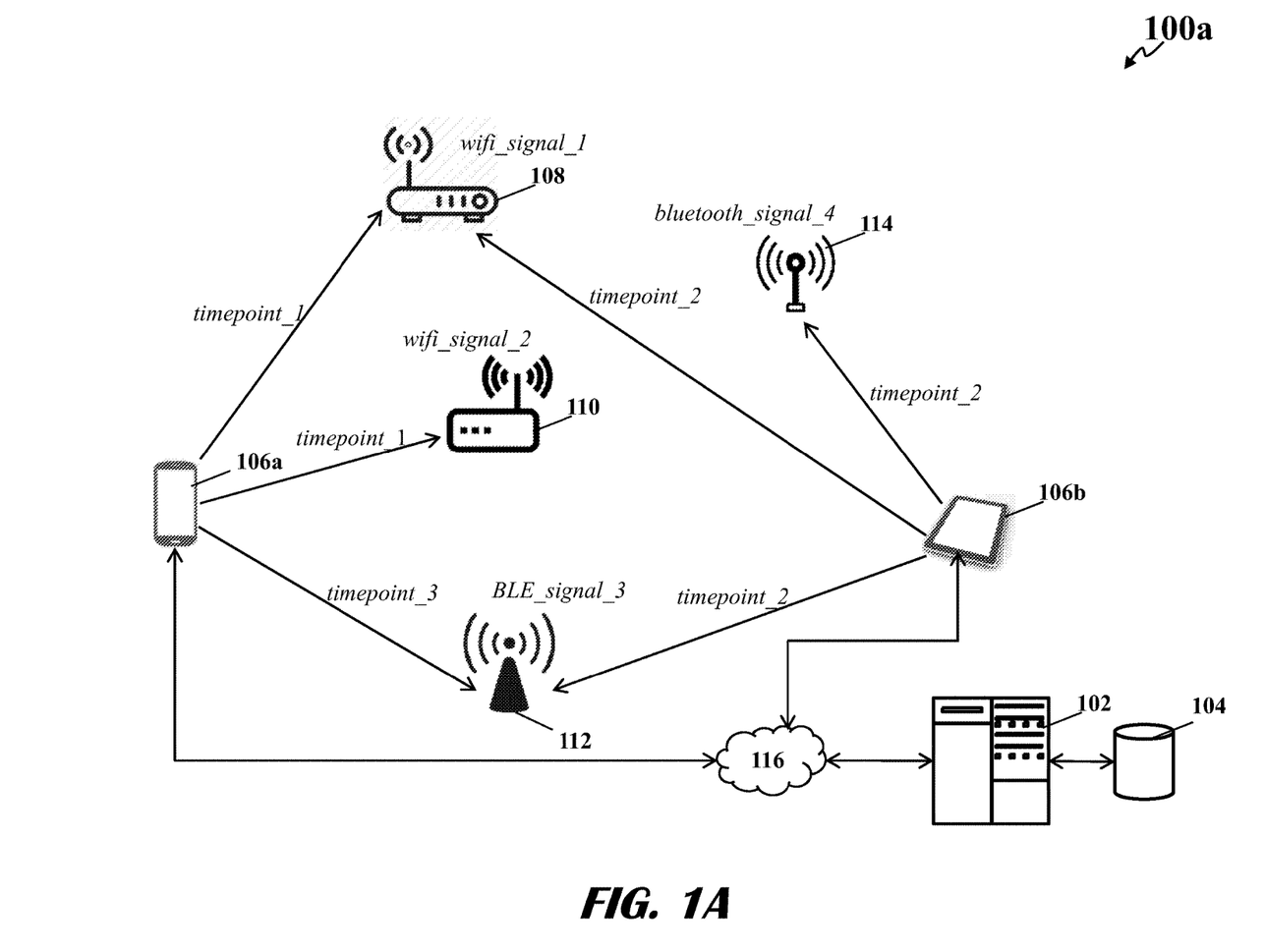
FIGS. 1A-1C illustrate network environments for validating legitimacy of electronic device usage, according to an embodiment.

FIG. 1A shows components of a network environment 100 for validating legitimacy of electronic device usage, according to an embodiment. The system 100 may include an analytic server 102 and a database 104 coupled to the analytic server 102, wherein the analytic server 102 may receive information on wireless signals (also referred to as signals) detected by one or more observer devices 106 through a network 116 to generate one or more hyperclusters. The analytic server 102 may be any kind of computing device such as a server computer, a desktop computer, a laptop computer in communication with one or more observer devices 106. The analytic server may receive identification information about wireless signals detected by the observer devices 106 and store the identification information in the database 104 for further processing.

As shown herein, a first observer device 106a, such as a smartphone, tablet, or other device, may detect, at timepoint_1, wifi_signal_1 generated by a first WiFi router 108 and wifi_signal_2 generated by a second WiFi router 110. A second observer device 106b, such as tablet computer, smartphone, or other device, may detect, at timepoint_2, wifi_signal_1 generated by the first WiFi router 108, bluetooth_signal_4 generated by Bluetooth transmitter 114, BLE_signal_3 generate by a Bluetooth low energy (BLE) transmitter 112. Furthermore, the first observer device 106a may detect, at timepoint_3, the BLE_signal_3 generated by the BLE transmitter 112. Each of the aforementioned signals may include a tuple of (name, MAC_address, type). Two signals may be considered equivalent of all three elements are equivalent.

Each of the observer devices 106 may transmit through the network 116 information of the detected signals to the analytic server 102 for storage in the database 104 and for further analysis. Based on the temporal persistence and spatial proximity of the signals observed by the observer devices 106 and received by the analytic server 102, the analytic server 102 may define or more hyperclusters associated with the location where the signals are received from.

The data model employed by the analytic server 102 to identify the hyperclusters may include a set of signals S observed by a population of observer mobile devices U. In the illustrative network environment 100a, S={will_signal_1, wifi_signal_2, BLE_signal_3, bluetooth_signal_4} and U={106a, 106b}. As described above, each of the signals in the set of signals S may include a tuple of (name, MAC_address, type). The analytic server 102 may identify each observer device 106 with a respective mobile advertising identifier (or any other identifier assigned to or associated with the app or observer device), abbreviated as adid. The analytic server 102 may associate each adid of the observer devices 106 with a matrix of signal and timepoints. More specifically, the analytic server 102 may construct a sparse Boolean matrix to denote which signals an observer adid (106) observed in a given time window. In other words, the Boolean matrix for an observer device 106 may indicate a presence of (indicated by entry 1) or absence of (indicated by entry 0) one or more signals, as detected by the observer device 106 for a particular time period. The analytic server 102 may, however, discard signals at stale timepoints as reported by observer devices 106 even though the stale timepoints may not indicate a nefarious behavior. For example, if an observer device 106 has a single observation that stretches credulity (threshold set at more than five days lag), the analytic server 102 may remove the observation. In some embodiments, the observer devices 106 may also transmit the respective latitude longitude coordinates of the observer devices.

Figure 1B:
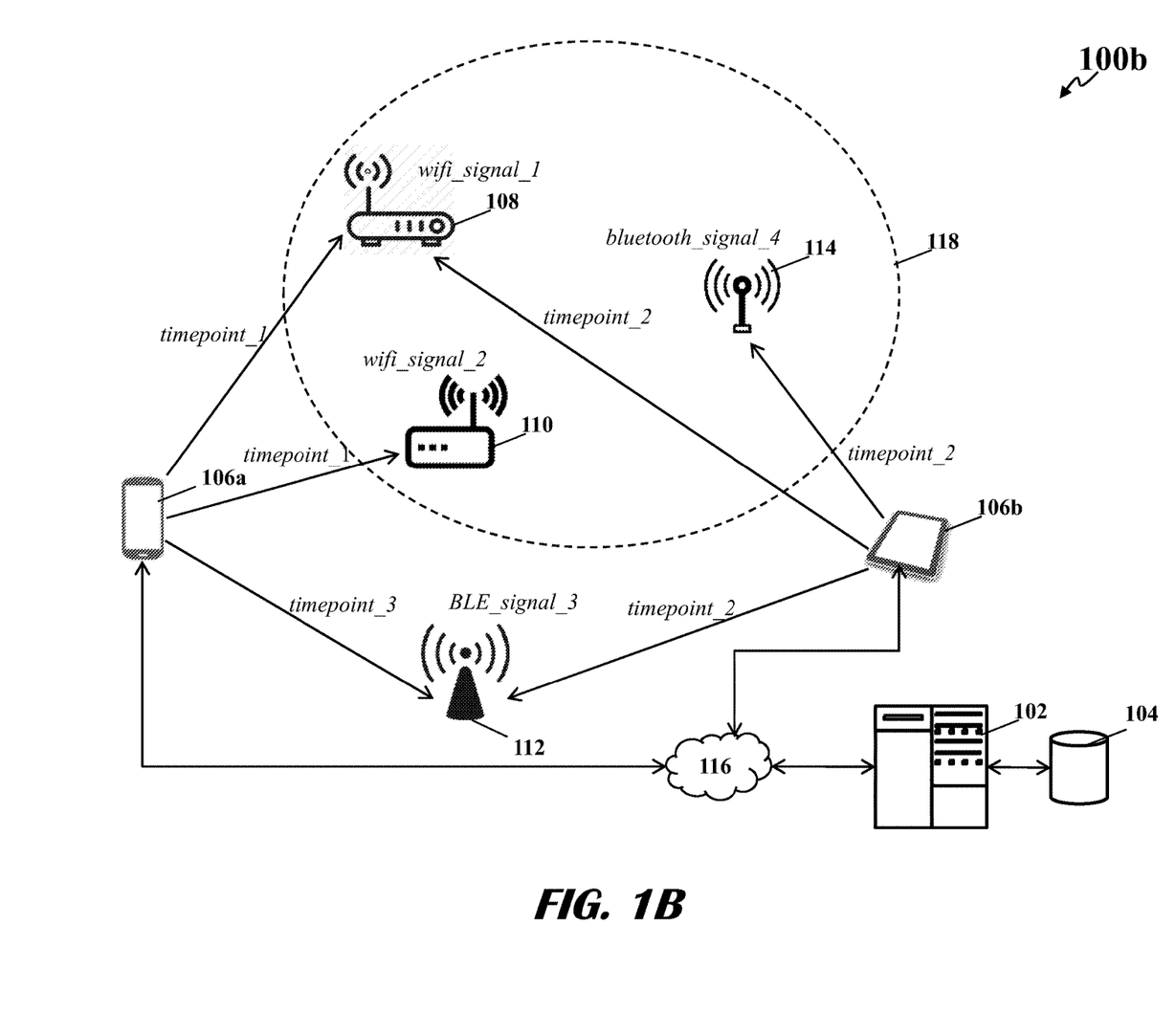

Based on the analysis of the matrices associated with the observer devices 106, the analytic server 102 may generate one or more hyperclusters based on the temporal persistence and spatial proximity of the received signals. FIG. 1B shows an illustrative network environment 100b including hypercluster 118 generated by the analytic server 102 based on the wireless signals detected by the observer devices 106. As shown, the hypercluster 118 may contain three wireless signals: wifi_signal_1, wifi_signal_2, bluetooth_signal_4. The analytic server 102 may determine the spatial proximity of wifi_signal_1, wifi_signal_2, bluetooth_signal_4 based on the fact that the these signals were detected simultaneously or near-simultaneously by each of the observer devices 106a, 106b. The analytic server 102 may determine the temporal persistence of wifi_signal_1, wifi_signal_2, bluetooth_signal_4 based on the fact that two observer devices 106a, 106b observed these signals at two time points: the first observer device 106a observed these signals at timepoint/and the second observer device 106b observed these signals at timepoint_2. However, the analytic server 102 may determine that BLE_signal_3, even though having spatial proximity with wifi_signal_1, wifi_signal_2, bluetooth_signal_4 may not have the requisite temporal persistence. For example, the first observer 106a did not detect BLE_signal_3 at timepoint_1.

Figure 1C:
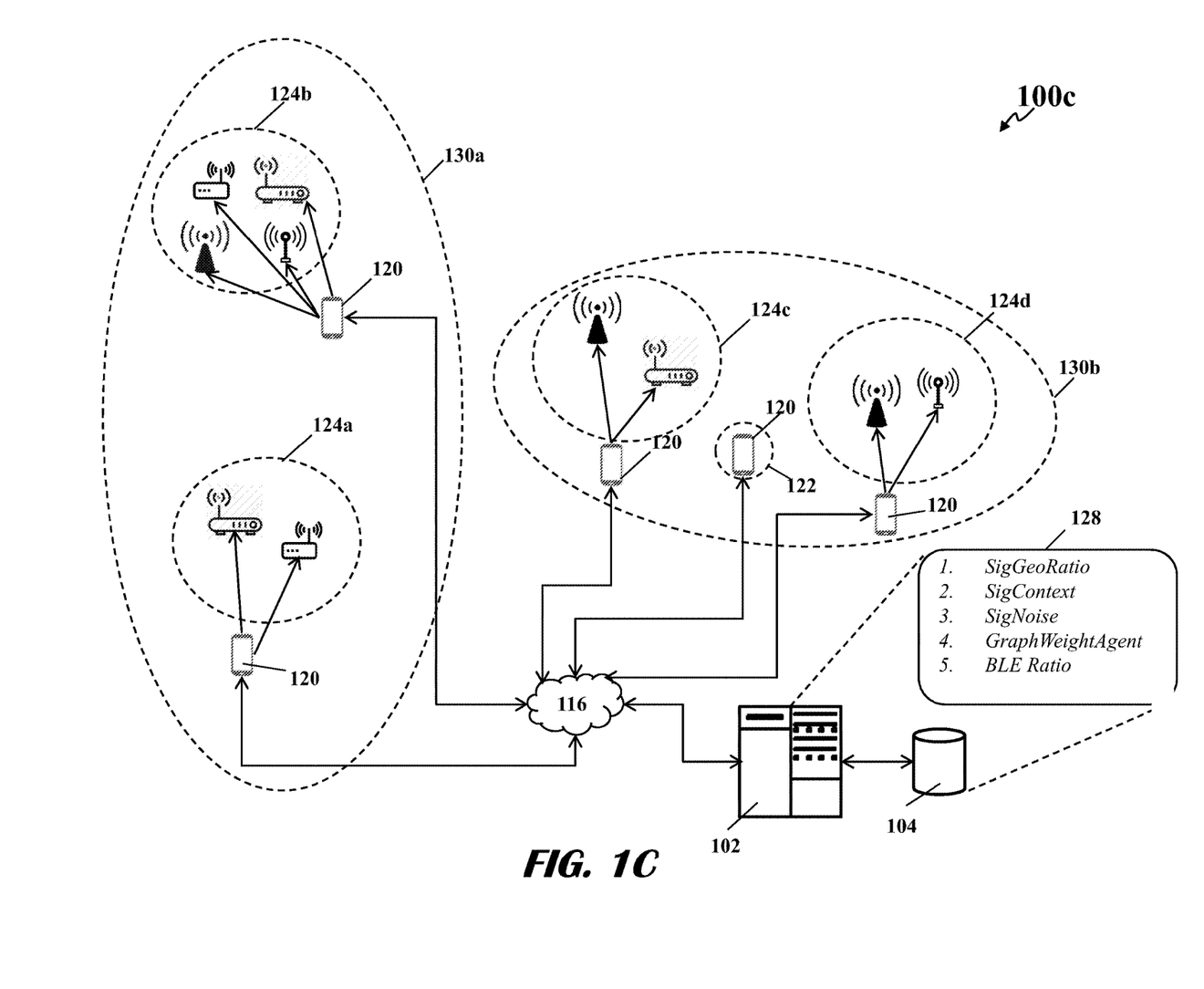

FIG. 1C shows an illustrative network environment 100c for validating whether a mobile device 120 is associated with a human user, according to an illustrative embodiment. The analytic server 102 may receive an indication from another server (not shown) that a mobile app has been installed on the mobile device 120. In response, the analytic server 102 may communicate with the mobile device 120 or one or more apps installed therein to track the interactions of the mobile device 120 with one or more signal environments. Based on these interactions, the analytic server 102 may determine that the mobile device 120 is being used by a human user or a device at a server farm which has installed the mobile app to fraudulently increase the install count number. In particular, the analytic server 102 may host and execute one or more classifiers 128 to make the determination with increasing sophistication. More specifically, the analytic sever 102 may execute a classifier with a lower computation cost and if determination cannot be made, the analytic server 102 may run a higher order, more sophisticated classifier, with a higher computation cost.

The analytic server 102 may execute a first classifier SigGeoRatio when locations are part of the signal observations (or detections) by the mobile device 120. The first classifier SigGeoRatio may evaluate the rate of change of geolocations versus signal clusters. The analytic server 102 may expect that the number of hyperclusters (signal clusters) may be higher than that of geolocations. For example, signal clusters 124a, 124b may be co-located at the same or nearly same geo-location 130a. Furthermore, signal clusters 124c, 124d may be co-located at the same or nearly same geo-location 130b. Within the geo-location 130b the mobile device 122 may be at a place 122 with no observed signal clusters. As shown herein, the analytic server 102 may observe five changes in signal context: hyperclusters 124a, 124b, 124c, 124d and a place 122 with no observable signals. However, these five changes may be associated with two geolocations 130a, 130b.

If the analytic server 102 is unable to determine whether the mobile phone 120 is used by a human based on Sig-GeoRatio classifier, the analytic server 102 may execute SigContext classifier to determine patterns of the mobile device 120's interaction with one or more of the hyperclusters 124. For example, the analytic server 102 may determine that the mobile device 120 detects the hypercluster 124a in the morning, hypercluster 124c during business hours, and hypercluster 124a again in the evening and overnight. Based on this determination, the analytic server 102 may indicate that the signal context (i.e., detection of the hyperclusters) adheres to or approximates the pattern associated with an average human user. Hypercluster 124a may be in the user's home and hypercluster 124c may in the user's office. In some embodiments, the analytic server 102 may not consider the geolocations of the mobile device 120 while executing the SigContext classifier.

If the analytic server 102 is unable to determine whether the mobile phone 120 is used by human based on SigContext classifier, the analytic server may execute the SigNoise classifier. Using the SigNoise classifier, the analytic server may analyze the ratio of persistent signals to the non-persistent (noise) signal to make a determination of a human user. If the analytic server 102 is unable to determine whether the mobile device 120 is being used by a human user using the SigNoise classifier, the analytic server 102 may execute a GraphWeightAgent classifier. Executing the GraphWeightAgent classifier, the analytic server 102 may determine that if other observer devices around a specific device are predominantly operated by humans, the specific device may be operated by a human too. In other words, the analytic server 102 may assign or transfer the validation of surrounding observer devices to another device in the vicinity. For example, if an electronic device is exposed to other human devices a lot, the electronic device may be associated with a human user. As another example, an electronic device that does not adhere to the typical pattern of movement expected from an average human user (for instance, a device used by an elderly user with limited mobility) may not observe any change in a signal context or noise context, but may be visited by other people with observer devices that may observe, periodically or otherwise, the signal context of the electronic device of the elderly user. If the analytic server 102 is unable to determine whether the mobile phone 120 is used by human based on the GraphWeightAgent classifier, the analytic server 102 may execute a BLERatio classifier. The BLERatio classifier may analyze the ad hoc movements of the electronic devices that observe or detect the Bluetooth signals to determine whether an electronic device is being used by a human.

Figure 2:
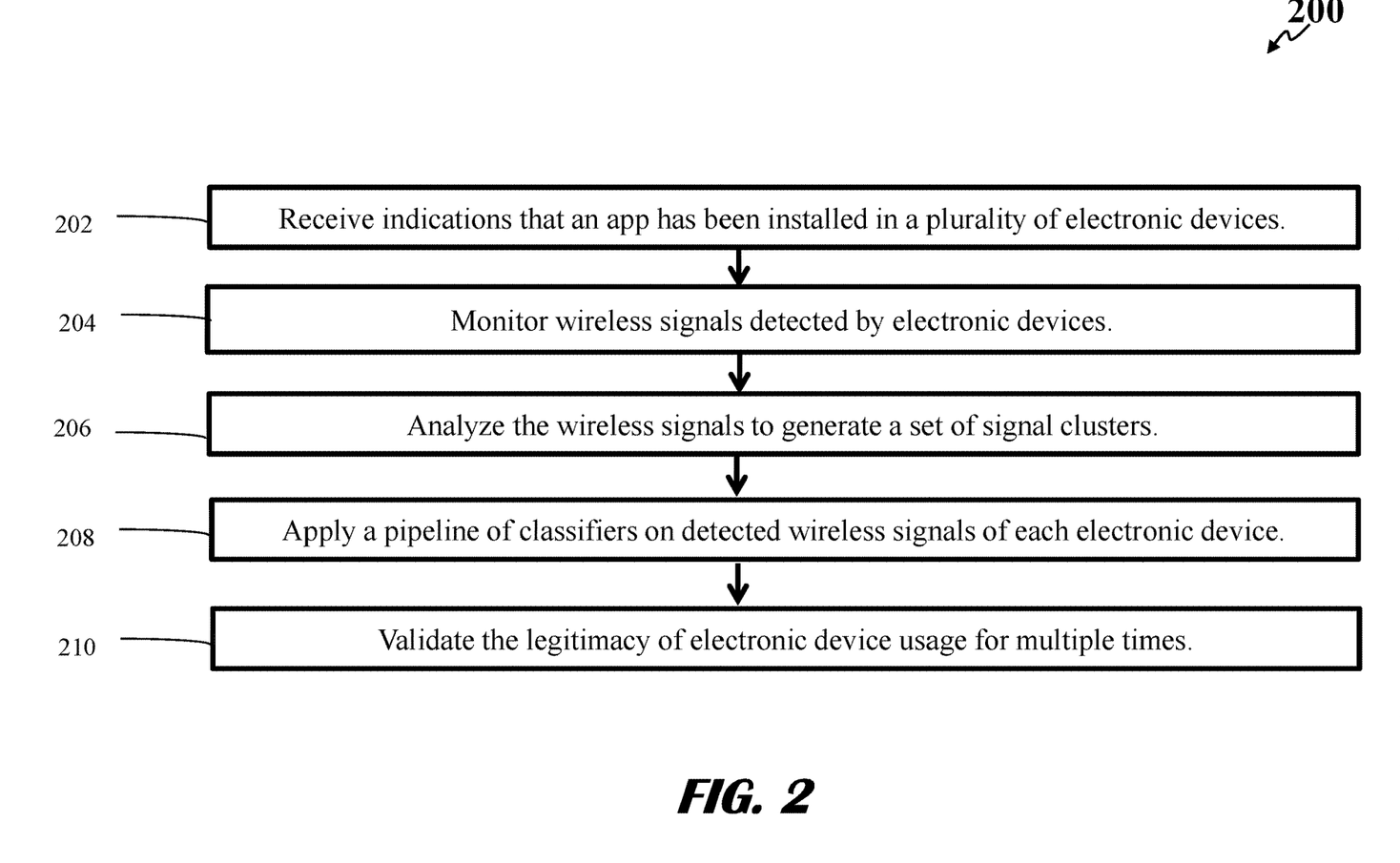
FIG. 2 illustrates a flowchart for validating legitimacy of electronic device usage, according to an embodiment.

FIG. 2 shows a flow diagram 200 of a method of validating legitimacy of electronic device usage, according to an illustrative embodiment. Other embodiments may comprise additional or alternative steps, or may omit some steps altogether. Although multiple computing systems and databases can implement one or more steps of the method, this description details, for brevity, an analytic server implementing the various steps of the method.

At step 202, the analytic server may receive indications that an app has been installed in a plurality of electronic devices, which may then trigger a signal scanning function on the electronic devices. An electronic device may be a mobile device (or handheld computer) that is portable enough to hold and operate in the hand. Typically, any handheld computer device will have a liquid-crystal display (LCD) flat screen interface, providing a touchscreen interface with digital buttons and keyboard or physical buttons along with a physical keyboard. Many such devices can connect to the Internet and interconnect with other devices such as car entertainment systems or headsets via WiFi, Bluetooth, cellular networks or near field communication (NFC). Mobile devices may run mobile operating systems that allow third-party apps specialized for said capabilities to be installed and run. In the embodiments disclosed herein, the users of the electronic devices may install a software application from a vendor and the analytic server may receive the notifications from one or more servers of the vendor. The installation of the software application may trigger a signal scanning function on the electronic devices. In some embodiments, an electronic device may be a stationary computer (such as a desktop computer), and the analytic server may receive an indication and authorization to scan and track the signal context of the stationary computer. Furthermore, electronic devices, mobile or non-mobile, may execute a browser application, and the analytic server, using the steps described herein may detect the signal context of the electronic device when the browser is being used. The signal scanning function may enable the electronic devices detect different wireless signals around the electronic device. The wireless signals may comprise WiFi, Bluetooth, and Bluetooth Light (BLE). The installation of the software application may also trigger the electronic devices to transmit the detected wireless signals to the analytic server. For instance, the electronic devices may transfer a tuple of (name, MAC_address, type) for the detected signals.

At step 204, the analytic server may monitor wireless signals detected by the electronic devices. The analytic server may collect the wireless signals detected by the electronic devices at different time points periodically. For example, the analytic server may query the detected wireless signals from the electronic devices every five minutes. The analytic server may monitor the electronic devices for a predetermined time window (e.g., a sliding window). For example, the analytic server may monitor the electronic devices for seven days.

The analytic server may monitor a given population of electronic mobile devices (users). Each electronic mobile device reports the detected signals to the analytic server. Let S denote a set of signals observed by the given population of mobile devices. As described above, a signal s may be a tuple (name, MAC_address, type). The analytic server may consider two signals to be equivalent if all three elements are equivalent. Each mobile user may be identified with a mobile advertising identifier (or any other identifier assigned to or associated with the app or observer device), sometimes abbreviated as adid. Different adids may represent different mobile phones and users. Each adid may be associated with a matrix of signals and time points. Each row is a signal in S, while time points T are of minute precision, and may be closed by a given time window for the analysis. The analytic server may construct a sparse Boolean matrix, $U \rightarrow Bool^{S \times T}$ to store which signals the mobile adid u observed in the given time window. If a mobile device observed a signal s at time t, the analytic server may set the corresponding element in the matrix to 1; otherwise, set the element to 0.

In some embodiments, electronic devices report time points that may be over a few days stale. Whether or not this is indicative of nefarious behavior, doing time-dependent signal analysis on an observer's (e.g., the mobile phone's)

signal observations may be difficult for the analytic server if their times are overly stale. If an observer had a signal observation that stretches credulity (the threshold set at more than five days lag), the analytic server may remove that observation (e.g., the detected wireless signals). In some embodiments, the analytic server may remove from consideration an observer (e.g., mobile device) with two or more incredible time points. Furthermore, some signal observations reported by mobile devices may also contain latitude longitude coordinates (LatLongPair). The analytic server may model the signals with the geo function U×S×T→LatLongPair. If the output pair is (0, 0), the analytic server may determine that the mobile device may not have reported its position for a given observation.

At step 206, the analytic server may analyze the wireless signals collected at different time points from different electronic devices to generate a set of hyperclusters (or signal clusters) based on the spatial proximity and temporal persistence of the wireless signals. The analytic server may also filter out signal data from electronic devices or observers with short lifespans (e.g., lifespans smaller than a threshold) using persistence filter. The electronic devices with short lifespans may be fraudulent devices (e.g., bots, emulators) that keep changing their identifiers, installing app instances and erasing the app instances. Even if installs with short lifespans are done by human users, the data generated by such electronic devices may not of good quality and may not be fit for commercial use-cases.

The lifespan of an electronic device may be the difference between the maximum and minimum time points for the electronic device. An electronic device with a lifespan of zero days may only make a single observation. Table 1 illustrates the persistence based on two apps, App+ that may have a healthy user base and App− that may have a dubious user base. A zero-day lifespan made it into the eight most frequent lifespans for both apps. For the most part App+, where less fraud is expected, had observers with maximum lifespans (the full month under consideration), while App− had observers with very short lifespans.

TABLE 1

Persistence Measure of Two Apps

|      | lifespan (days) | user count |
|------|-----------------|------------|
| App+ | 28              | 132909     |
|      | 29              | 103246     |
|      | 27              | 13892      |
|      | 30              | 8786       |
|      | 26              | 7664       |
|      | 0               | 7519       |
|      | 25              | 5948       |
|      | 31              | 5047       |
| App− | 0               | 541        |
|      | 28              | 439        |
|      | 1               | 122        |
|      | 29              | 90         |
|      | 2               | 87         |
|      | 3               | 76         |
|      | 27              | 74         |
|      | 25              | 70         |

Filtering out observers (e.g., electronic devices) with short lifespans may speed up the classification process. It may also indicate the quality of user base, because even if users with short lifespans are human users; the data they generate may not be fit for commercial use-cases. After filtering out low quality data from electronic device with short lifespans, the analytic server may analyze data (e.g., detected signals) from persistent electronic devices with long lifespans and generate a set of signal clusters based on such data.

At step 208, the analytic server may apply a pipeline of classifiers (e.g., five classifiers) on the detected signals of each electronic device to validate the legitimacy of electronic device usage based on the set of signal clusters. Each classifier may take as input a set of adids, and may produces two disjoint sets: a set of adids that may be identified as used by human users, and a set of adids that are deemed unknown. Formally, a classifier C is typed as C: $2^U \rightarrow (2^U, 2^U)$. The first set of the output tuple are devices that are identified as carried by human, and the second set are devices that are labeled as unknown. Given an input $U_{in}$ and its corresponding outputs ($U_t$, $U_u$), then $U_{in}=U_t \cup U_u$ and $U_t \cap U_u = \emptyset$. In other words, the classifier may decide one way or the other, but not both.

The analytic server may execute the pipeline comprising the following classifiers:

SigGeoRatio—This analytic server may apply this classifier when locations are part of observations. This classifier may observe the rate of change of geo locations versus signal clusters. It is expected that the number of signal contexts is higher than the number of geo locations for human-operated mobile devices.

SigContext—This classifier builds signal contexts that are deemed of significant importance to the device. If such contexts exist and are visited in a predictable fashion, then the signals indicate that the user has a stable pattern of life. In some embodiments, this classifier may not consider geo locations. Thus, given the assumptions on the attacker, a believable pattern-of-life (based on signals) can label a given device as operated by a human.

SigNoise—When there may not enough signal observations to conclude that a pattern-of-life exists, the analytic server may use a ratio of non-persistent signals (noise signals) to persistent signals to determine human users.

GraphWeightAgent—The analytic server may determine that if other electronic devices around a specific device are dominantly operated by humans, the specific device is operated by a human too. In other words, the analytic server may assign or transfer the validation of surrounding devices to nearby device. For example, if an electronic device is exposed to other human devices most of the time, the electronic device may be associated with human user as well.

BLERatio—When the analytic server takes Bluetooth and BLE devices into consideration, it may become unlikely for attackers to spoof. Because the Bluetooth and BLE signals may be transitory, these signals may represent the case that the Bluetooth or BLE device happens to be in an environment and then leaves it. The BLERatio classifier may therefore observer the ad hoc movements of the electronic devices that observe or detect the Bluetooth or BLE signals.

The aforementioned classifiers may have different computational costs, where SigGeoRatio may be the most efficient and BLERatio may be the least efficient. The fraud-detection pipeline may be defined as SigGeoRatio>>SigContext>>SigNoise>>GraphWeighAgent>>BLERatio. At each stage, the analytic server may push the unknown users to the next classifier in chain, while retaining the human users. The final output may be a union of all human sets.

In the process of validating the legitimacy of the usage of an electronic device, the analytic server may apply the pipeline of five classifiers on the set of wireless signals detected by the electronic device. Specifically, the analytic server may execute the first classifier to determine the legitimacy of the electronic device usage based on the set of signal clusters. If based on the first classifier, the analytic server determines the electronic device is a legitimate human device, the validation process ends; otherwise, the analytic server may determine that the legitimacy of the electronic device usage is unknown, and apply the second classifier on the wireless signals of the electronic device. If the second classifier does not validate the electronic device usage, the validation process may keep going for the third, fourth, and fifth classifiers, until one of the classifiers determines the usage of the electronic device is legitimate. If after five classifiers, none of the classifiers validates the electronic device usage, the analytic server may determine the electronic device is not legitimate (e.g., not operated by a human).

The classifiers are further described below.

SigGeoRatio Classifier

If an electronic device changes geographic position by a few kilometers, the electronic device should generally not be able to see the same wireless signals. Some exceptions may happen with mobile devices, but these should be minute compared to the bulk of the observed signals. The analytic server may determine an electronic device is observing a new signal set (or signal cluster) if the Jaccard similarity score (also known as Intersection over Union) between the set of observed signals and the set of signals seen in any previous observation is less than a threshold, such as 0.1. For example, if one observation an electronic device saw signals {A, B, C, D, E} and in a following observation the electronic device saw signals {A, C, F, G, H, I, J}, then the Jaccard similarity score would be $$\frac{\{A, C\}}{\{A, B, C, D, E, F, G, H, I, J\}} = \frac{2}{10} = .2$$

Therefore, the new observation would have enough overlap with the previous observation to not be considered a new signal set. The analytic server may count the device's unique locations by mapping the latitude/longitude coordinates to a 5-character geohash. The analytic server may classify a device as operated by human if the number of signal sets is at least the number of geohashes. Otherwise, a given device appears to be moving across large distances without losing the majority of the signals. Such a device may be protecting its privacy by obscuring its location, or it may be a fraudulent install.

Figure 3:
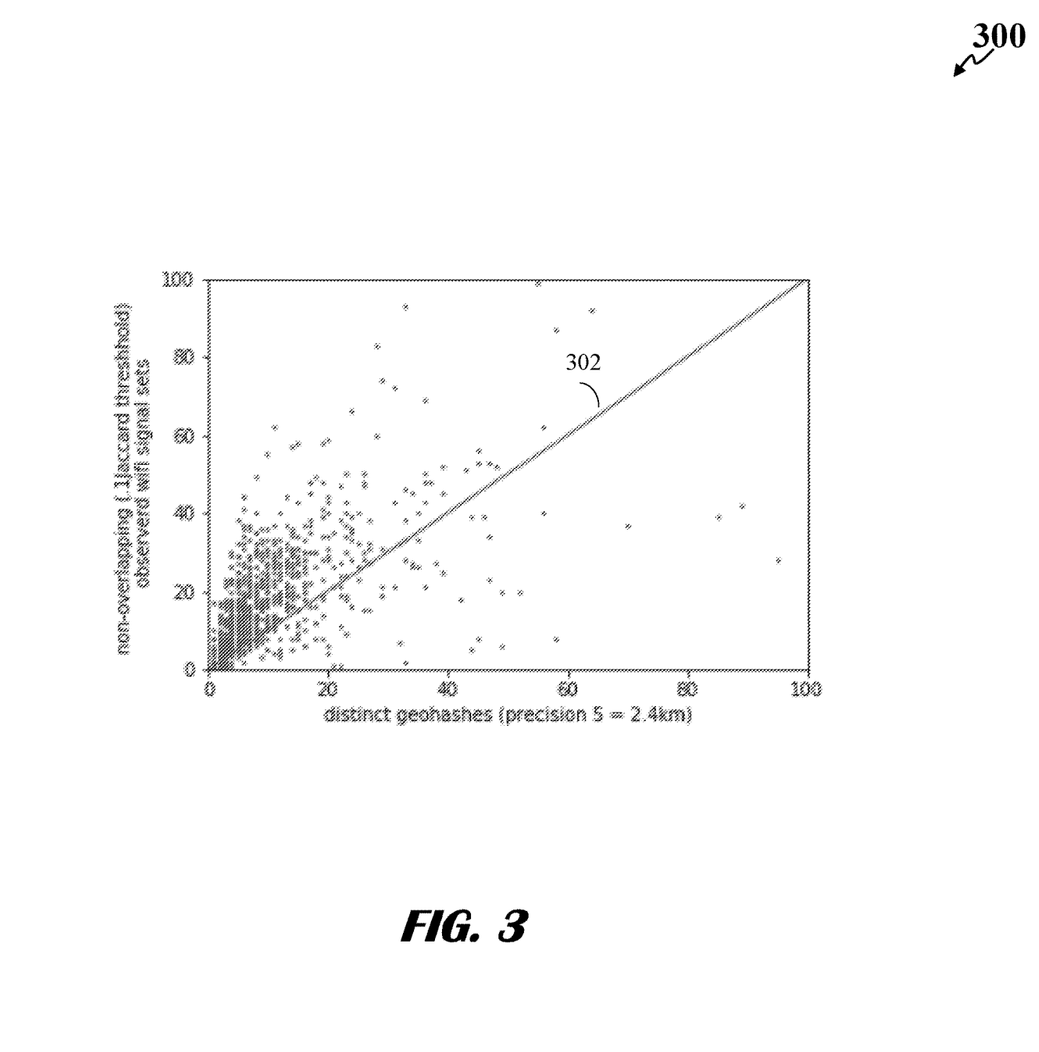
FIG. 3 illustrates the number of signal sets and the number of geohashes for electronic devices' observations, according to an embodiment.

As an illustration of the above analysis, FIG. 3 shows the number of signal sets and the number of geohashes for electronic devices' observations 300. The line 302 shows where the ratio is one-to-one. The electronic devices that fall below that line are reporting more location than signal sets. Such devices may be fraudulent; the analytic server may push such devices to the other classifiers. The analytic server may determine that devices having exactly one signal set and exactly one geohash are not human and push such devices to other classifiers. The reason is that such behavior is expected for devices that are not mobile or for devices that stationed in install farms. Finally, if an electronic device does not supply geo readings, the device automatically fails this classifier.

SigContext (Signal Context) Classifier

A typical person in the dataset may have a few locations where they spend the majority of their time. For example, a person may alternate between home and work, or bounce around between home, gym, library, and favorite brunch spot. Such patterns however may not hold true for mobile phones or emulators that are static and simply spoof their geo location changes. The analytic server may determine the locations by computing frequent signal contexts (or signal clusters) for each mobile device. A signal context or a signal cluster is a set of signals that are often observed together.

Figure 4:
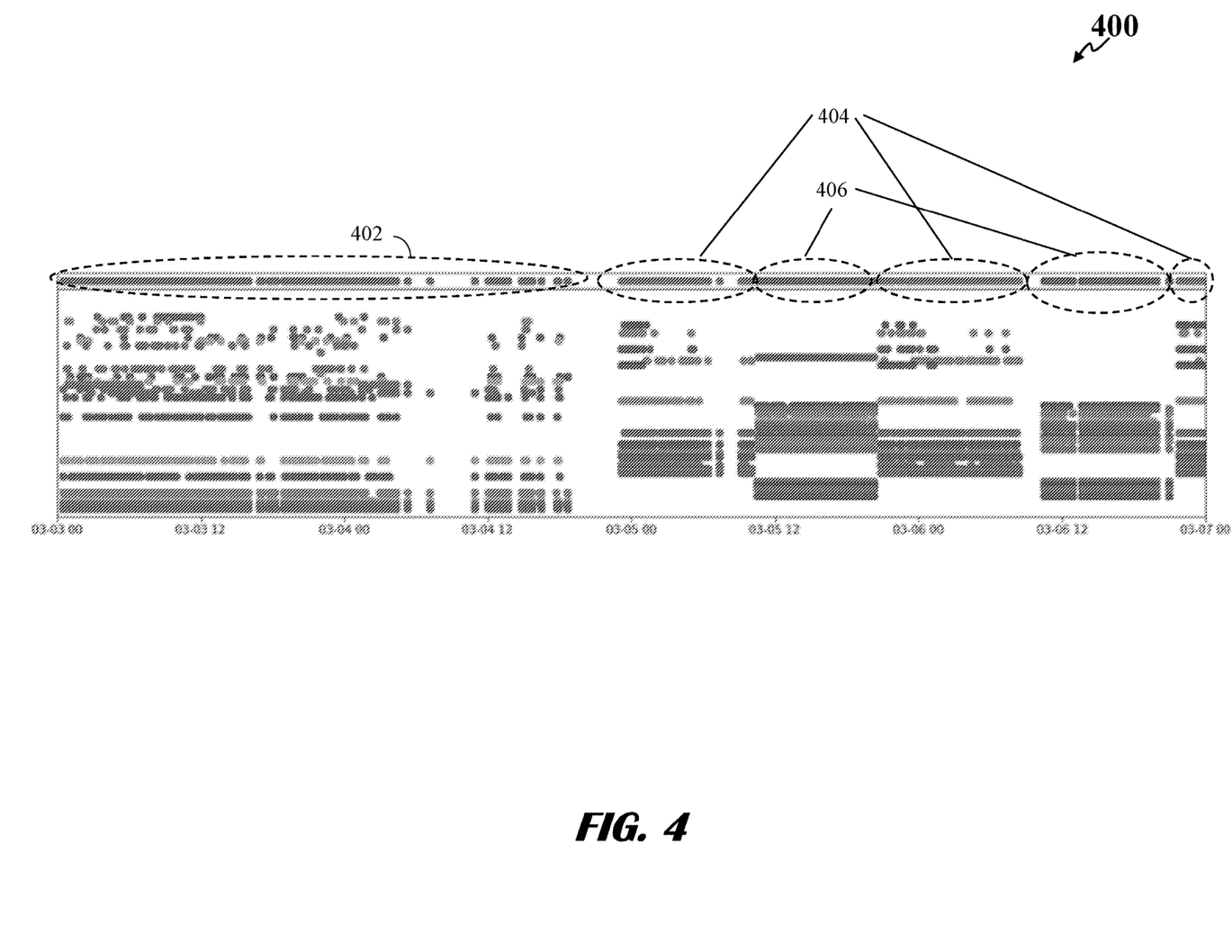
FIG. 4 illustrates signal contexts for a single electronic device over a four-day period, according to an embodiment.

FIG. 4 illustrates signal contexts for a single electronic device (e.g., adid) over a four-day period 400. There may be three distinct contexts. The contexts may not static, or in other words, each context may contain signals that are present some but not all of the time. To build and determine signal context changes, the analytic server may determine representative signals. In FIG. 4, the top demonstrates three representative signals 402, 404, 406. The classifier may thus detect when this device switches from one environment to another.

To determine which signals are representative, the classifier may filter out any signal that is dependent on another signal. The classifier may select non-dependent signals satisfying a threshold as representative signals. For example, the classifier may select non-dependent signals that are seen in at least 1% of observations. The analytic server may choose different threshold values for different requirements.

To define dependent signals in more detail, let freq(s) be the number of observations where s is observed. Let freq $(s_1 \cap s_2)$ be the number of observations where both $s_1$ and $s_2$ are observed. The analytic server may determine that $s_1$ is dependent on $s_2$ if:

$$\frac{freq(s_1 \cap s_2)}{freq(s_1)} > 0.4 \land freq(s_1) < freq(s_2)$$

The analytic server may close the dependent relation on a signal set S. In other words, the analytic server may remove all dependent signals from S. The analytic server may use different parameters to define dependent signals in different scenarios. The analytic server may apply this classifier as follows. First, the analytic server may determine representative signals for each signal context by grouping all observations that transitively share signals, and selecting one representative signal for that set of observations. The analytic server may determine representative signals for all sets of observations. In a word, the analytic server may approximate a signal context with a representation signal.

Finally, the classifier may classify an adid as human if its signals has two different recurring contexts, and at least 20% of the observations came from the most frequent recurring context, and at least 1% of the observations came from the second most frequent recurring context. The analytic server experimentally derives the given hyper-parameters (e.g., 20%, 1%) from dataset. The parameters may be different values in different applications/scenarios.

SigNoise Classifier

To identify changes between signal contexts, the analytic server may remove noise signals. There may be cases when devices, however, may not have persistent contexts, for example, when travelling or simply due to lack of data. To that end, the analytic server may execute a noise classifier that looks at a distribution of signals. Based on the dataset, the analytic server expects most devices to see a few key signals quite often and many other signals only once. The analytic server may refer the signals seen once as noise.

Figure 5:
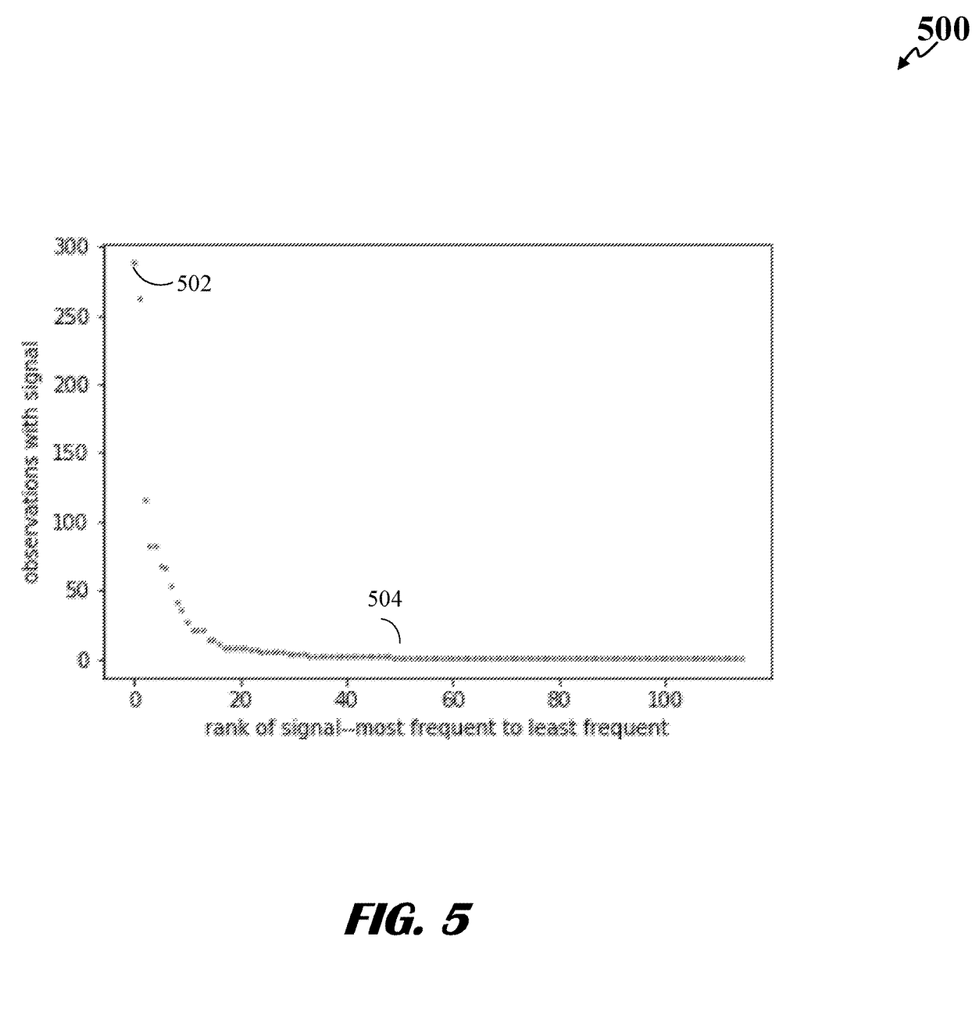
FIG. 5 illustrates rank of signals observed by an electronic device based on frequency, according to an embodiment.

FIG. 5 illustrates rank of signals observed by an electronic device based on frequency 500. The figure displays a Pareto-type distribution of the signals. The electronic device observed the most frequent signal 288 times 502, and there are 66 noise signals that electronic device only observed once 504. For most of the devices in the dataset, plotting their signal frequencies in this way may produce nearly the same curve. The scales may be different, because the devices may observe a different total number of signals, and their most frequent signals may be observed different numbers of times.

Figure 6:
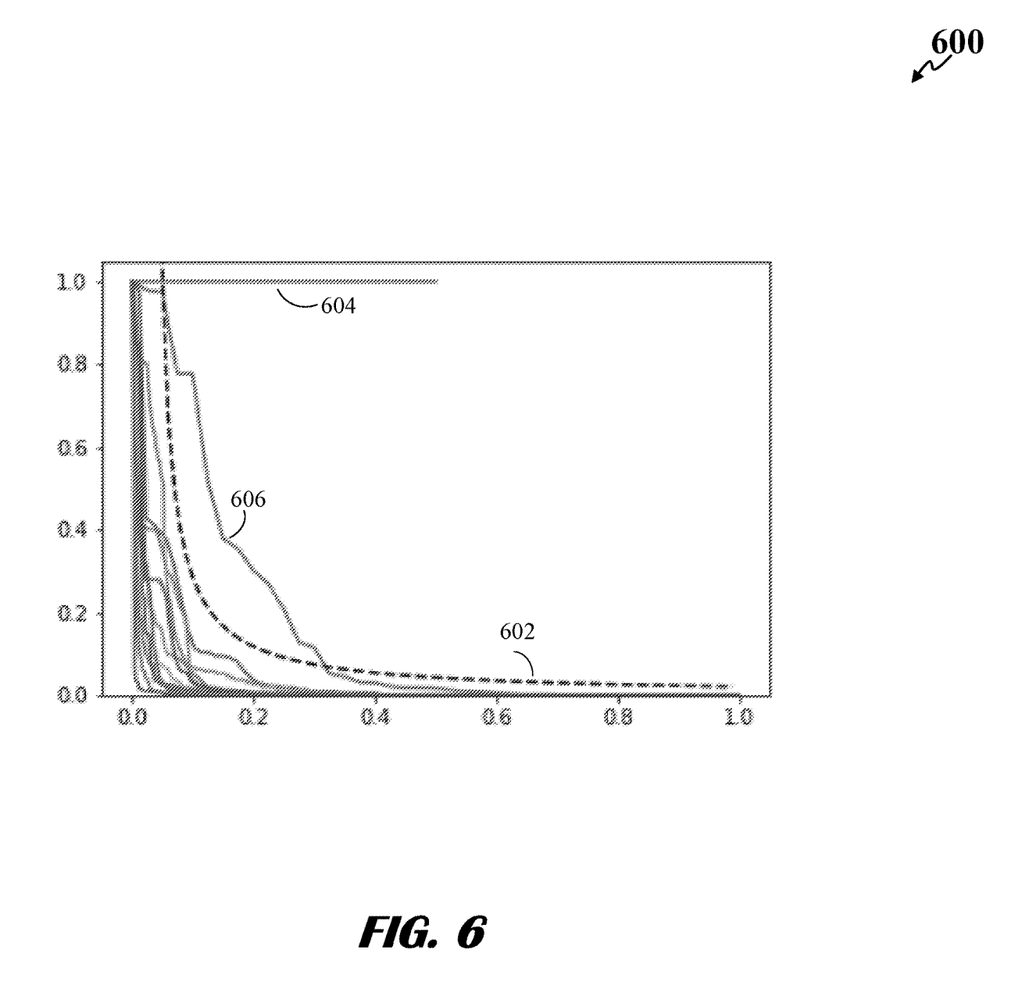
FIG. 6 illustrates the rank of signals based on frequency after normalization, according to an embodiment.

FIG. 6 illustrates the rank of signals based on frequency when the analytic server normalizes the plots to fit in the unit box 600. A curve 602 may be the proposed boundary function. Most of the devices may be bounded by this function, while two devices in this figure may be concerning. A line 604 at the top may be a device that may observe the same two signals in each observation. A curve 606 may be more subtle, but may still indicate behavior that classifier would deem as not human.

At step 210, the analytic server may validate the legitimacy of the electronic device usage for multiple times. In some embodiments, the analytic server may make the decision of whether an electronic device is operated by a human for multiple times in a continuous process. For example, the analytic server may make the decision every day for five days. In other words, every day the electronic device has a chance to become human device. On day one, the analytic server may make the first decision based on the wireless signals collected during the sliding window prior to day one (e.g., previous 7 days of the day one). On day two, the analytic server may make the second decision based on the wireless signals collected during the sliding window prior to day two. The analytic server may make five decisions in five days. In some embodiments, the analytic server may validate the legitimacy of the device usage, if any of the decision indicates the device is a human device. In some other embodiments, the analytic server may validate the legitimacy of the device usage, if the number of positive decisions (e.g., determining the device is a human device) is larger than the number of negative decisions (e.g., determining the device is not a human device). The analytic server may make the decision in a different frequency. For example, instead of making the decision daily, the analytic server may make the decision every minute. In some embodiments, the computer may generate a probability score indicating the likelihood that the app is being used by human users. The probability score may be based upon executing the first, second, third, fourth, or fifth classifiers for the mobile device and a plurality of other mobile devices containing a copy of the app.

Such a process may help the analytic server to improve the decision accuracy. For example, a human device may not move much during the first several days after installation of the app. The analytic server may determine the device is not a human device on day one. However, by making the decision multiple times, the analytic server may eventually determine the electronic device is a human device on the following days.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method comprising:
receiving, by a computer, an indication that a mobile software application has been installed on a mobile device;
triggering, by the computer, a signal scanning function on the mobile device to cause the mobile device to detect wireless signals and transmit identification information of the detected wireless signals to the computer;
receiving, by the computer, identification information of a plurality of wireless signals detected by the mobile device at different time points for a predetermined time window;
generating, by the computer, a set of one or more signal clusters associated with the mobile device based on the spatial proximity and temporal persistence of the plurality of wireless signals; and
executing, by the computer, a first classifier to determine whether the mobile device is operated by a human user based upon a change of geolocations of the mobile device and a change between the one or more signal clusters observed with the mobile device.

2. The computer-implemented method of claim 1, wherein the first classifier determines whether the mobile device is operated by a human user based upon a rate of change of geolocations of the mobile device compared to rate of change between the one or more signal clusters observed by the mobile device.

3. The computer-implemented method of claim 1, further comprising:
in response to the computer being unable to determine that the mobile device is being operated by a human user by executing the first classifier:
executing, by the computer, a second classifier to determine whether the mobile device is operated by a human user based on a pattern of the mobile device being proximate to one or more signal clusters.

4. The computer-implemented method of claim 3, wherein the pattern of the mobile device being proximate to one or more signal clusters include the mobile device being proximate to a first signal cluster at a first timepoint and the mobile device being proximate to a second signal cluster at a second timepoint for a predetermined number of days.

5. The computer-implemented method of claim 3, further comprising:
in response to the computer being unable to determine that the mobile device is being operated by a human user by executing the second classifier:
executing, by the computer, a third classifier to determine whether the mobile device is operated by a human user based on a ratio of persistent signals to non-persistent signals.

6. The computer-implemented method of claim 5, wherein the third classifier determines that the mobile device is operated by the human user if a function of the ratio of persistent signals to non-persistent signals is within a boundary function.

7. The computer-implemented method of claim 5, further comprising:
in response to the computer being unable to determine that the mobile device is being operated by a human user by executing the third classifier:
executing, by the computer, a fourth classifier to determine whether the mobile device is operated by a human user based on a proximity of the mobile device to other known human used mobile devices.

8. The computer-implemented method of claim 7, further comprising:
in response to the computer being unable to determine that the mobile device is being operated by a human user by executing the fourth classifier:
executing, by the computer, a fifth classifier to determine whether the mobile device is operated by a human user based on a proximity of the mobile device to Bluetooth or BLE signal sources.

9. The computer-implemented method of claim 8, further comprising:
generating, by the computer, a probability score based on executing the first, second, third, fourth, or fifth classifier for the mobile device and a plurality of other mobile devices for the mobile software application.

10. The computer-implemented method of claim 1, wherein the identification information of each detected signal includes a tuple of a name of the signal, machine access code of the device generating the signal, and a type of the signal.

11. A system comprising:
a non-transitory storage medium storing a plurality of computer program instructions; and
a processor electrically coupled to the non-transitory storage medium and configured to execute the plurality of computer program instructions to:
receive an indication that a mobile software application has been installed on a mobile device;
trigger a signal scanning function on the mobile device to cause the mobile device to detect wireless signals and transmit identification information of the detected wireless signals to the processor;
receive identification information of a plurality of wireless signals detected by the mobile device at different time points for a predetermined time window;
generate a set of one or more signal clusters associated with the mobile device based on the spatial proximity and temporal persistence of the plurality of wireless signals; and
execute a first classifier to determine whether the mobile device is operated by a human user based upon a change of geolocations of the mobile device and a change between the one or more signal clusters observed with the mobile device.

12. The system of claim 11, wherein the first classifier determines whether the mobile device is operated by a human user based upon the rate of change of geolocations of the mobile device compared to rate of change between the one or more signal clusters observed by the mobile device.

13. The system of claim 11, wherein the processor is configured to further execute the computer program instructions to:
in response to the processor being unable to determine that the mobile device is being operated by a human user by executing the first classifier:
execute a second classifier to determine whether the mobile device is operated by a human user based on a pattern of the mobile device being proximate to one or more signal clusters.

14. The system of claim 13, wherein the pattern of the mobile device being proximate to one or more signal clusters include the mobile device being proximate to a first signal cluster at a first timepoint and the mobile device being proximate to a second signal cluster at a second timepoint for a predetermined number of days.

15. The system of claim 13, wherein the processor configured to further execute the computer program instructions to:
in response to the processor being unable to determine that the mobile device is being operated by a human user by executing the second classifier:
execute a third classifier to determine whether the mobile device is operated by a human user based on a ratio of persistent signals to non-persistent signals.

16. The system of claim 15, wherein the third classifier determines that the mobile device is operated by the human user if a function of the ratio of persistent signals to non-persistent signals is within a boundary function.

17. The system of claim 15, wherein the processor is configured to further execute the computer program instructions to:
in response to the processor being unable to determine that the mobile device is being operated by a human user by executing the third classifier:
execute a fourth classifier to determine whether the mobile device is operated by a human user based on a proximity of the mobile device to other known human used mobile devices.

18. The system of claim 17, wherein the processor is configured to further execute the computer program instructions to:
in response to the processor being unable to determine that the mobile device is being operated by a human user by executing the fourth classifier:
execute a fifth classifier to determine whether the mobile device is operated by a human user based on a proximity of the mobile device to Bluetooth or BLE signal sources.

19. The system of claim 18, wherein the processor is configured to further execute the computer program instructions to:
generate a probability score based on executing the first, second, third, fourth, or fifth classifier for the mobile device and a plurality of other mobile devices for the mobile software application.

20. The system of claim 11, wherein the identification information of each detected signal includes a tuple of a name of the signal, machine access code of the device generating the signal, and a type of the signal.

* * * * *